COMBINED MECHANICAL-MAGNETIC ARTICLE TRANSFER APPARATUS

Filed Dec. 11, 1964 6 Sheets-Sheet 1

INVENTOR

C. R. Fegley,

BY R. P. Miller

ATTORNEY

March 29, 1966 C. R. FEGLEY 3,243,036

COMBINED MECHANICAL-MAGNETIC ARTICLE TRANSFER APPARATUS

Filed Dec. 11, 1964 6 Sheets-Sheet 4

3,243,036

COMBINED MECHANICAL-MAGNETIC ARTICLE TRANSFER APPARATUS

Charles R. Fegley, Laureldale, Pa., assignor to Western Electric Company, Incorporated, New York, N.Y., a corporation of New York Filed Dec. 11, 1964, Ser. No. 417,556
9 Claims. (Cl. 198—210)

This invention relates to a combined mechanical-magnetic article transfer apparatus, and more particularly to a combination of mechanical devices for transferring a paramagnetic workpiece onto a turret having facilities for both magnetically and mechanically holding the workpiece during advance past a fabricating device.

In the manufacture of certain small semiconductor devices such as transistors, it is necessary to automatically advance the transistor components through a series of fabricating stations. Care must be exercised to maintain the orientation of the components during the transfer and, subsequent to transfer, the components must be securely gripped to permit certain fabricating operations, such as the trimming of leads extending through the components. The holding of transistor components presents another problem in that certain of the elements or portions thereof are extremely fragile thereby precluding the use of positive gripping mechanical devices.

It is an object of the invention to provide a new and improved combined mechanical and magnetic article transfer apparatus.

It is a further object of the invention to provide a transfer apparatus wherein a magnetic device acts on a fragile paramagnetic section of an article to position a non-fragile section to be gripped by a positive acting mechanical device.

An additional object of the invention is the provision of an apparatus for lifting an article from a conveyor and then transferring the article onto a turret having both magnetic and mechanical holding facilities.

Concomitant with the last object, it is another object to provide a turret having magnetic holding facilities that function to position articles to be gripped by mechanical facilities which are rendered effective by the advance of the turret to securely hold the articles in position while a trimming device acts to trim leads extending from the article.

Another object of the invention resides in a combination of a magnetic holder for advancing paramagnetic parts into position to be welded to an intermittently advancing conveyor strip which functions to convey the parts away from the magnetic holder.

With these and other objects in view, the present invention contemplates the use of a combined mechanical and magnetic article transfer apparatus wherein the articles are mechanically transferred onto a turret having magnetic devices for initially gripping and positioning articles in predetermined orientations whereafter rotation of the turret is effective to operate mechanical devices to positively grip each succeeding article as it moves into position to be acted on by a fabricating device. During the initial portion of the transfer, a non-fragile portion of each article is mechanically gripped and the article is transferred from a feed rack into the vicinity of the turret where the magnetic device acts on a paramagnetic fragile portion of the article to hold the article on the turret following release of the first mechanical gripping device. Next the turret is rotated to advance the article toward a trimming device. As the turret rotates, one of a series of gripping plates is moved to grip a non-fragile portion of the article so that the article is rigidly held during the trimming operation. Following the trimming operation, the gripping plate is released and a mechanical ejector engages and withdraws the article from the magnetic device and thereafter deposits the article in a suitable receptacle.

In an alternative embodiment of the invention, the turret advances each article into position to be engaged and acted upon by welding electrode which functions to weld a non-fragile portion of each article to an intermittently advanced metallic strip. Following each welding operation, the turret and the strip are advanced whereupon the welded article moves with the strip and away from the influence of the magnetic device.

Other objects and advantages of the present invention will be apparent when considered in detail in conjunction with the accompanying drawings wherein.

Figures 1, 2, 10:
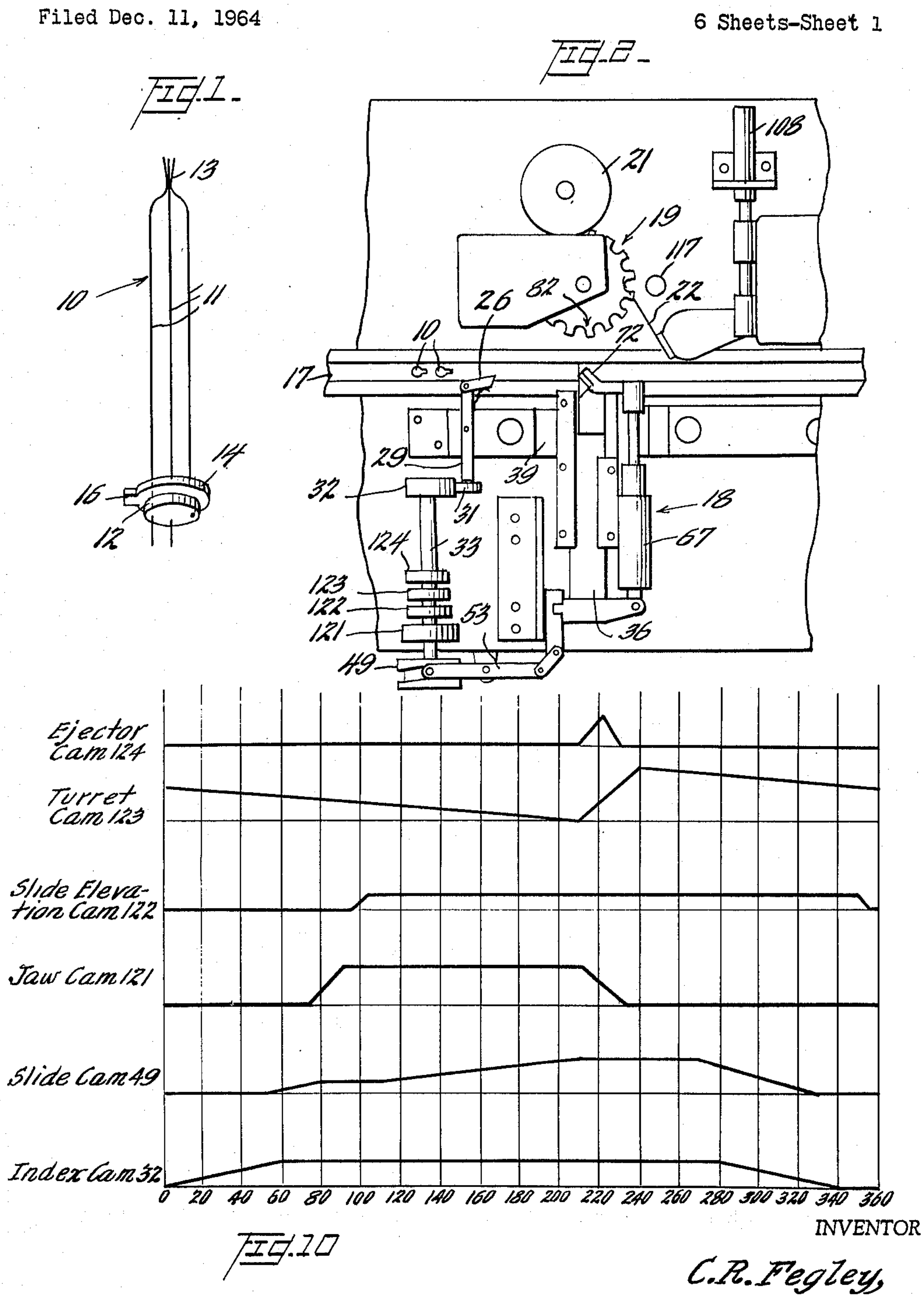
FIG. 1 is a perspective view of an article such as a transistor component which may be transferred by the apparatus shown in the other views.
FIG. 2 is a top plan view of a combined mechanical-magnetic article transfer apparatus embodying the principles of the present invention.
FIG. 10 is a timing diagram illustrating a cycle of operation of and the functional relationship between the various component devices shown in the other views.

Referring first to FIG. 1, an article 10, which may be transferred and fabricated by the apparatus shown in the other figures is known as a transistor header and consists of a group of three paramagnetic wires 11 extending to a cup-like base 12. The wires 11 are spaced apart in a triangular array and are welded together at their upper extremities 13. Two of the wires 11 extend through the base and are cut or trimmed by the apparatus shown in the other views. The cup-like base contains a ceramic material for holding the wires 11. Extending from the base is a flange 14 having a tab 16. The wires 11 are relatively fragile and cannot be readily gripped by a mechanical device whereas the base 12 and the welded extremities 13 are rigid and hence can be gripped by a mechanical device.

The headers 10 are mounted in a rack 17 (see FIG. 2) which is cyclically indexed to advance each header into alignment with a first transfer device 18. The first transfer device 18 functions to grip the welded extremities 13 of a header and lift each header from the rack and then advance the header into the vicinity of a turret device 19. The turret device has a plurality of magnets circumferentially spaced about its periphery so that each header is held on the turret upon subsequent release by the first transfer device 18. The turret device 19 is indexed whereupon mechanical facilities are actuated to grip the flange 14 to securely hold the header while a grinding wheel or disc 21 trims the lower extremities of the two projecting wires 11. Subsequent advance of the turret device moves the trimmed header 10 into position to be engaged by an ejector 22. The mechanical gripping facilities on the turret device 19 are thereupon released and the ejector arm 22 is operated to move the header against the action of the associated magnet. The trimmed header is moved into a suitable receiving receptacle.

RACK FEED AND MECHANICAL TRANSFER

Figures 3, 4:
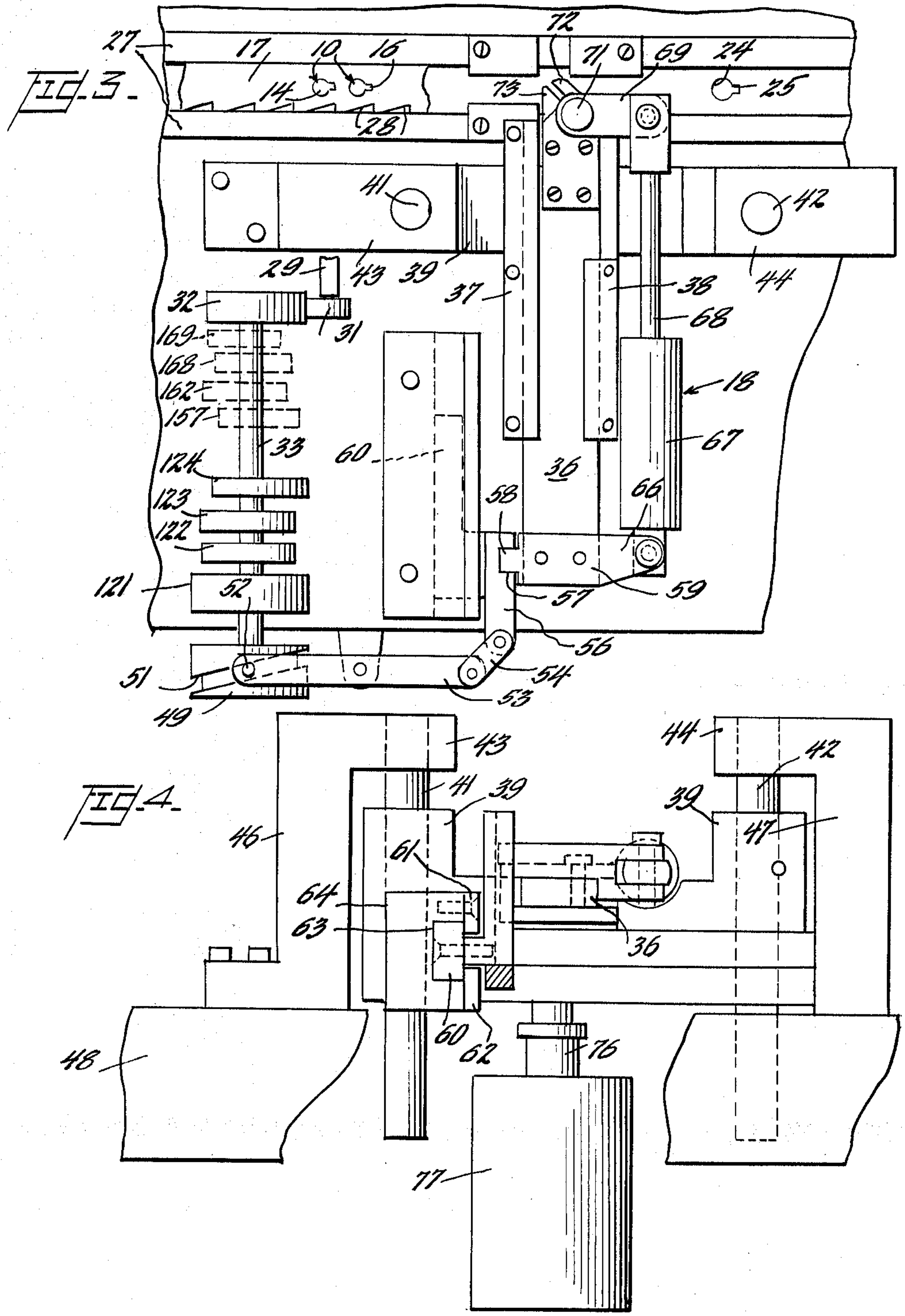
FIG. 3 is a top plan view of a mechanical transfer device for moving an article from a rack onto a turret.
FIG. 4 is a partial end view of the transfer apparatus shown in FIG. 3 particularly showing the facilities for elevating the transfer mechanism.

Attention is now directed to FIGS. 2, 3, and 4, for a consideration of the first transfer device 18 which functions to move the header 10 from the rack 17 and onto the turret device 19. The rack 17 may be of one length or constructed in short sections which abut each other. This rack has a series of nesting slots 24 into which the base 12 of the header 10 is received. Each slot has a radially extending recess 25 for receiving the tab 16 extending from the flange 14 of the header to hold the header in a predetermined orientation within the rack 17. The rack 17 is cyclically advanced along a trackway 27 by a pawl 26 that is spring-biased into engagement with teeth 28 formed along the side of the rack. The pawl 26 is pivotally mounted on a lever 29 having a cam follower 31 riding on a constantly rotating lobed cam 32 secured to a shaft 33.

The first transfer device 18 includes a slide 36 mounted between gibs 37 and 38 that are secured to a slide block 39 pinned or otherwise attached to a pair of axially moving bearing rods 41 and 42 (see particularly FIG. 4). The upper extremities of the bearing rods 41 and 42 extend through bearings mounted in arms 43 and 44 which inwardly project toward each other from oppositely disposed standards 46 and 47. Both of these standards are attached to a base 48.

The slide 36 is moved in and out by a cam 49 that is attached to the constantly rotating shaft 33. The cam 49 is of the barrel type and has a slot 51 to receive a cam follower 52 attached to one end of a lever 53. The opposite end of the lever 53 is pivotally connected through a link 54 to an actuator bar 56 having a vertically extending slot 57 to receive a guide extension tab 58 which projects from a crossbar 59 connected to the slide 36. The actuator bar 56 is attached to a slide bar 60 captivated by members 61 and 62 to ride within a channel 63 formed in a block 64 that is also attached to the base 48. The slide bar 60 will move with the slide 36 and acts to support actuator bar 56 and, secondly, to provide stability to the rear portion of the slide 36.

Extending from the crossbar 59 is a bracket 66 to which is pivotally connected to one end of an air cylinder 67. Air cylinder 67 has a piston rod 68 which is connected to a link 69 that, in turn, is pivotally mounted on a stud shaft 71 secured to the slide 36. The link 69 has a jaw section 72 that cooperates with a jaw section 73 fixed to the slide 36 to grip the header 10 in the vicinity of the welded extremities 13.

In order to elevate the slide 36, the block 39 on which the slide 36 is mounted, is attached to a piston rod 76 extending from air cylinder 77. When air cylinder 77 is operated and the piston rod 76 moves up as viewed in FIG. 4, the block 39 and the slide 36 will also move up. The tab 58 thereupon rides in the slot 57 formed in the actuator bar 56. The lever 53 may be operated by the cam 49 to move the actuator bar 56 inwardly or outwardly as viewed in FIG. 3, consequently, the tab 58 will move the crossbar and the attached slide 36 inwardly and outwardly. When the slide 36 initially moves inwardly, the air cylinder 67 is operated to move the jaw section 72 to engage the welded extremities 13 against the fixed jaw section 73. The air cylinder 77 is then operated and the block 39, together with the slide 36, is elevated so that the jaws 72 and 73 withdraw the header 10 from the nesting slot 24. The cam 49 thereupon further pivots the lever 53 to move the slide 36 to advance the header 10 into the vicinity of the turret device 19.

TURRET DEVICE

Referring now to FIGS. 5, 6, 7, 8, and 9, for consideration of the turret device 19 which functions to grip and hold the header while the header is moved past the grinding wheel 21 into position to be removed by operation of the ejector arm 22. The turret device includes a generally cylindrical-shaped turret body 81 having a plurality of permanent magnets 82 secured to and spaced about its periphery. The body of the turret is machined from stock composed of brass or other non-magnetic material. The magnets 82 are bar-shaped and are positioned at an elevation to receive the fragile shanks or center portions of the wires 11 of the header 10. The wires 11 are constructed of a paramagnetic material and when the first transfer device 18 advances a header into a position adjacent to the turrent device 19, the aligned magnet 82 will exert a force to attract and hold the header on the magnet.

The transfer device 18 moves the header 10 to position the base portion 12 in one of a series of slots 83 formed in a ring plate 84. The flange 14 of the header will overlie the slot 83. Radially arrayed about the turret body 81 are six segments 85 (see FIG. 8). Each segment is provided with slots 86 to receive the wires 11 and is of such size as to overlie the flange 14. Each segment 85 is attached to a cylindrical member 87 which, in turn, is fixed to a slide rod 88. Each slide rod 88 is mounted within a bearing sleeve 89 fitted within a bore 91 extending through the turret body 81. Further, each slide rod has a headed member 92 that is slotted to receive a cam roller 93 rotatably mounted on a shaft 94. A spring 95 is interposed between the top of the sleeve bearing 89 and the bottom of the headed member 92 to urge the cam follower roller 93 in an upward direction. The rod 88 and the attached segment 85 is also urged upwardly to provide a suitable space between the segment and the ring plate 84 to receive the flange 14 of the header 10.

Figure 5:
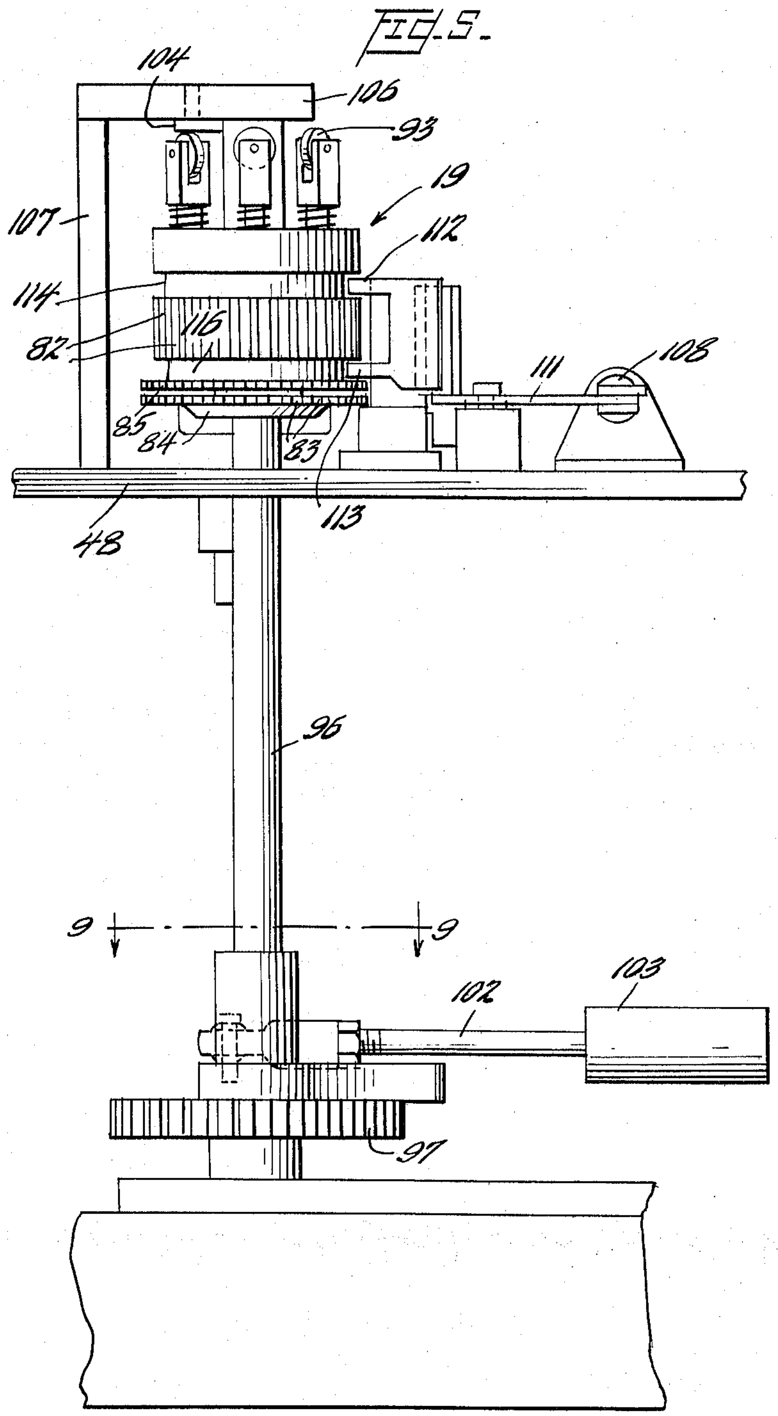
FIG. 5 is a side elevational view of a combined mechanical and magnetic gripping turret for advancing articles past a trimming device.
Figure 6:
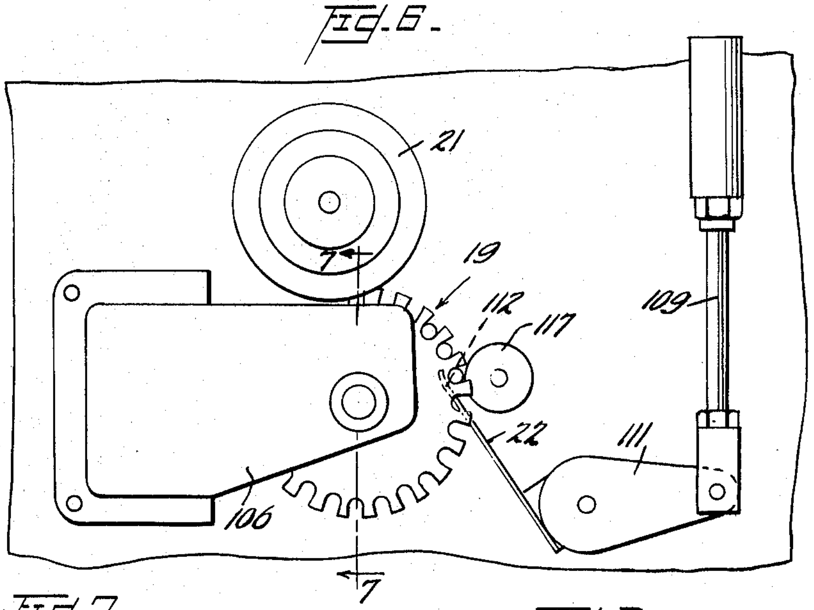
FIG. 6 is a top plan view of the turret shown in FIG. 5 together with an ejector for removing parts from the turret.
Figure 7:
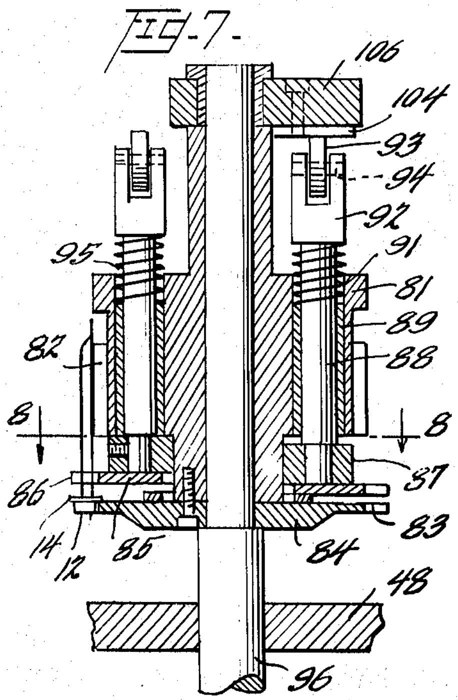
FIG. 7 is a sectional view through the center of the turret taken along line 7—7 of FIG. 6 showing mechanical facilities for positively gripping portions of articles that are being held by the magnetic holding facilities.
Figure 8:
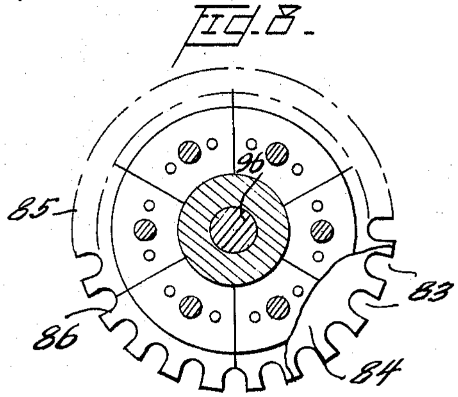
FIG. 8 is a sectional view taken along line 8—8 of FIG. 7 particularly illustrating a group of segmental gripping plates.
Figure 9:
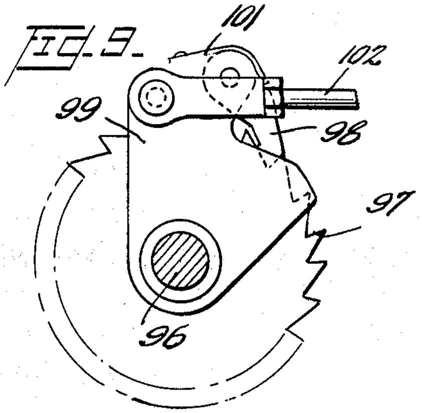
FIG. 9 is a view taken along line 9—9 of FIG. 5 showing a pawl and ratchet for indexing the turret.
Figure 11:
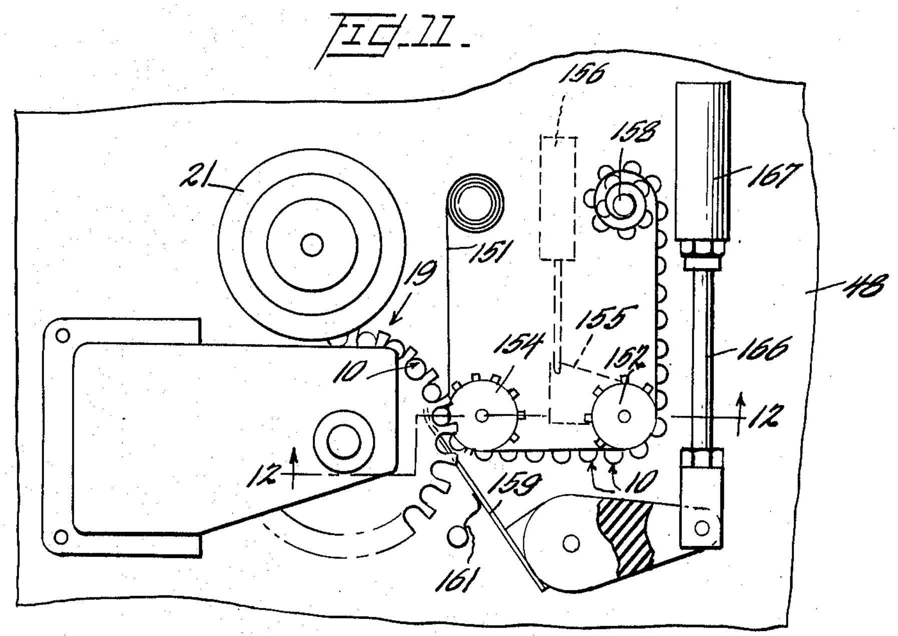
FIG. 11 is a top plan view of an alternative embodiment of the invention wherein the trimmed articles are shown as being welded to an intermittently advanced metallic strip.
Figure 12:
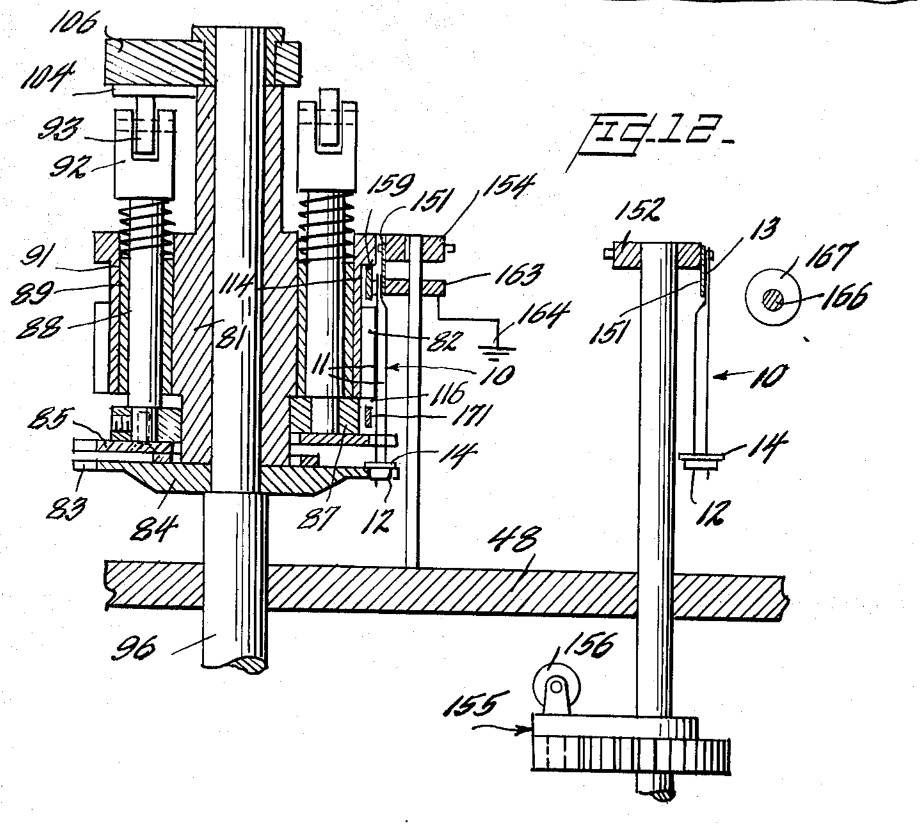
FIG. 12 is a side elevational view of the alternative embodiment shown in FIG. 11, particularly illustrating welding facilities together with facilities for intermittently advancing the strip.
Figure 13:
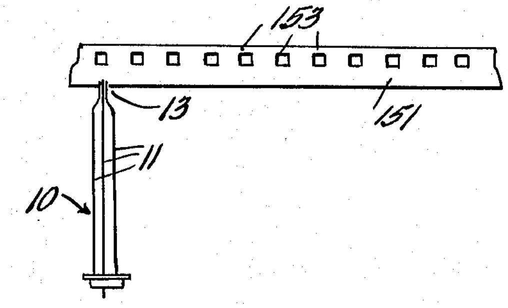
FIG. 13 is a side view of a section of the metallic strip showing the articles welded to the strip.
Figure 14:
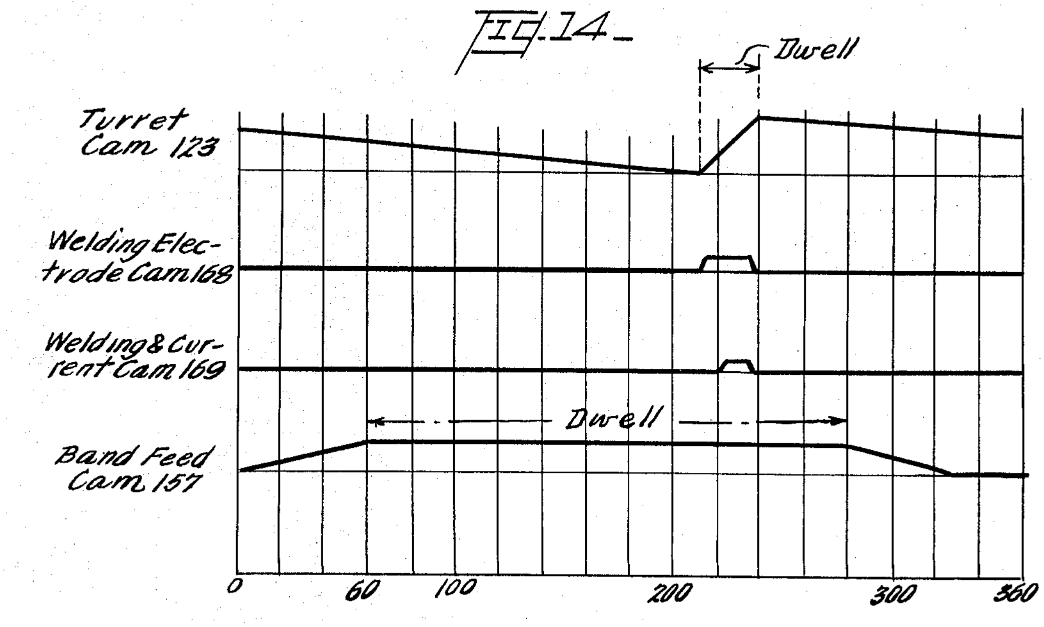
FIG. 14 is a timing diagram illustrating the operational relationship between the turret and the welding facilities.

The turret body 81 is secured to a shaft 96 which is cyclically indexed by a pawl and ratchet mechanism shown in FIGS. 5 and 9. More particularly, the shaft 96 is attached to a ratchet 97 that is engaged by a pawl 98 pivotally mounted on a flat arm 99 rotatably mounted about the shaft 96. A spring 101 urges the pawl 98 into engagement with the teeth of the ratchet 97. Pivotally connected to the arm 99 is a piston rod 102 that extends into an air cylinder 103. Each operation of the air cylinder 103 rotates the pawl 98 and ratchet 97 to index the shaft 96 to present a pair of aligned slots 83 and 85 to the first transfer mechanism 18.

As the cam body 81 is indexed, the cam rollers 93 successively engage a flat cam plate 104 secured to a bracket arm 106 laterally extending from an upright support 107 (see FIG. 5) which is also secured to the base 48. As the cam roller 93 engages the cam plate 104, the rod 88 is moved downwardly to move the associated segment 85 to grip the flanges 14 of the headers 10 against the plate 84. As each gripped header 10 is advanced toward the grinding wheel 21, the grinding wheel is rotated to trim the two extending leads 11 of the header 10.

Upon further index of the turret device 19, each roller 93 moves from engagement from the cam plate 104 and thereby moves upwardly under the urging of the associated spring 95, thus moving the associated segment 85 from engagement with the flanges 14. Following each advance of the turret device 19, an air cylinder 108 (see FIGS. 2, 5, and 8) is operated to move a piston rod 109 which, in turn, pivots a plate 111 having the ejector 22 attached thereto. The ejector 22 has a pair of fingers 112 and 113 which fit within annular recesses 114 and 116 formed in the turret body 81. These fingers 112 and 113 subtend the magnets 82 and act against the wires 11 near the rigid welded extremities 13 of the wires 11 and the base 12 to remove the header 10 from the magnet and transfer the trimmed header into a suitable receptacle 117.

OPERATION

For a consideration of the over-all operation of the apparatus, attention is directed to FIGS. 2 and 10. Initially, the index cam 32 pivots the pawl 27 to advance the rack 17 to position a header in register with the first transfer device 18. The cam 49 is now rendered effective to move the slide 36 forward to move the jaws 72 and 73 about the welded wire extremities 13 and the aligned header 10. A cam 121 is then rendered effective to complete a simple control circuit (not shown) to operate a valve (not shown) to admit air to the cylinder 67. Operation of air cylinder 67 moves the jaw 72 to grip the welded wire extremities 13. A cam 122 is next rendered effective to operate another simple electrical control circuit which functions to operate a valve to admit air to the elevator cylinder 77 (see FIG. 4) whereupon the block 39 and slide 36 are elevated to move the wires 11 of the header 10 into spaced alignment with a magnet 82 attached to the turret device 19. The cam 49 thereupon further pivots the lever 53 to move the slide 36 to advance the header to position the wires 11 in engagement with the aligned magnet 82. Cam 121 now functions to control the release of air from the cylinder 67 whereupon the jaw 72 is opened allowing the magnet 82 to now hold the header 10 on the turret device 19.

A further cam 123 is utilized to control a simple electrical pneumatic control system to supply air to the cylinder 103 (see FIG. 5) whereupon the turret device 19 is indexed one increment. Following each three advances of the turret body 81, the cam 104 acts against a roller 93 and a segment 85 is moved to grip the aligned flanges 14 of the headers 10 advanced into the turret device 19. Finally, a cam 124 is rendered effective to control the application of air to the cylinder 108 which controls the pivoting of the ejector arm 22. The fingers 112 and 113 act against the more rigid portions of the wire 11 to move the header from the associated magnet 82 and advance the trimmed header into the receptacle 117. The various mechanisms are thereafter restored to their initial positions in anticipation of another cycle of operation of the over-all apparatus.

Attention is directed to FIGS. 11, 12, 13, and 14 for an understanding of an alternative apparatus for removing the trimmed transistor headers 10 or other paramagnetic articles from the turret device 19. In this embodiment, the turret 19 and associated magnets 82 again incrementally advance the headers into position to be withdrawn. The withdrawal is accomplished by welding the upper extremities 13 of the wires 11 to a metallic band or tape 151. This band 151 is advanced by a cyclically-operated feed wheel 152 having radially-extending pins that project into feed holes 153 formed in the band. An idler roller 154 having radially-extending pins is mounted adjacent to the periphery of the turret 19 to guide the band into position to receive the header 10. The feed wheel 152 is incrementally rotated by a pawl and ratchet mechanism 155 (similar to the pawl and ratchet mechanism shown in FIG. 9) that is operated by an air cylinder piston arrangement 156 controlled by a cam 157 mounted on shaft 33 (see FIG. 3). The band, together with the articles welded thereon, is wound on a reel 158 which may be driven by a torque motor.

As each header 10 is advanced into the removal position, a pivotally mounted welding electrode 159 is advanced to move or press the extremities 13 of the header wires 11 into engagement with the band 151. This welding electrode 159 is initially positioned within the annular recess 114 and thus is positioned behind each advanced group of header wires 11. Current is applied to the welding electrode 159 through a flexible strap 161. The welding current passes through the extremities 13 of the wires and the band 151 to a guide electrode 163 mounted beneath the idler roller 154, which may be stationary and acts as a fixed electrode. A suitable ground connection 164 is provided for the electrode guide 163. The pivotally mounted electrode 159 is connected to a piston rod 166 that is controlled by an air cylinder 167. The air cylinder may be actuated by a pneumatic system under control of a simple circuit that in turn may be actuated by another cam 168 mounted on the shaft 33. In this instance, the electrode 159 is moved during the dwell period in the advance of the turret 19. As soon as the welding electrode 159 contacts the extremities 13, a further cam 169 on the cam shaft 33 applies the welding current to the strap 161 to effectuate the welding of wires of the transistor header 10 to the band 151.

In order to assist the movement of the header base 12 from between the now open segment 85, the electrode 159 may be provided with a depending arm 171 (similar to finger 113) which rides within the annular recess 116. As the electrode 159 is pivoted, the arm 171 also moves to act against the rigid or non-fragile lower section of the wires 11 that are firmly connected to the base 12. In summary, it may be appreciated that following the welding of the header 10 to the band 151, the subsequent advance of the band by the operation of the feed wheel 152 results in the movement of the header 10 from the holding field of the associated magnet 82.

It is to be understood that the above-described arrangements of apparatus and construction of elemental parts are simply illustrative of the application of the principles of the invention and many other modifications may be made without departing from the invention.

What is claimed is:

1. In an apparatus for feeding paramagnetic articles,
   a turret,
   a plurality of magnets secured to and spaced about the periphery of said turret for holding said articles,
   a plurality of gripping elements movably mounted on said turret for gripping said articles held by said magnets,
   means for biasing said gripping elements away from said articles,
   means for rotating said turret, and
   means acting against said elements to overcome said biasing means during a portion of the rotation of said turret for successively moving said gripping element to grip said articles.

2. In an apparatus for transporting disc-shaped parts, each having a group of paramagnetic wires extending therethrough,
   a turret,
   a first plate secured to the underside of the turret and having a plurality of radial slots extending inwardly from the periphery thereof,
   a plurality of segments slidably mounted on the turret and having radial slots aligned with and corresponding to the slots formed in the plate,
   means mounted on said turret for biasing the segments away from the plate to provide a space between the segments and the plate,
   a series of magnets mounted about said turret for individually holding each group of wires to position the associated disc-shaped part in the space between a segment and the plate with the wires extending through said aligned slots,
   means for rotating the turret, and means positioned to be engaged by each succeeding biasing means advanced by said turret for overcoming each biasing means to move the associated segment to grip the disc-shaped parts against said plate.

3. In an apparatus for feeding a transistor header having a flanged body and plurality of paramagnetic wires extending from said body,
a turret,
a plate attached to the bottom of said turret and having a plurality of notches formed about its periphery,
a plurality of rods slidably mounted in said turret with their axis parallel to the axis of said turret,
a number of gripping segments individually mounted on the ends of said rods,
each of said segments having peripheral recesses aligned with the notches formed in said plate,
a plurality of magnets attached to said turret in alignment with said notches and recesses for holding the wires of the header to position the flanged bodies between said plate and segments,
means for resiliently biasing said rods to position said segments away from said plate,
means for rotating said turret, and
a cam for engaging said rods as the turret rotates for overcoming said resilient biasing means to move the rods and segments to engage the flanges of the bodies.

4. In an apparatus for transporting paramagnetic articles,
a turret having a pair of spaced annular recesses,
a group of magnets uniformally spaced about said turret and attached thereto between said annular recesses,
a pivotably mounted ejector having a pair of fingers mounted thereon for movement through said annular recesses,
means for advancing a succession of paramagnetic articles into a loading position,
means for intermittently rotating said turret to move said magnets through said loading position to receive and hold said articles with the ends thereof extending over said annular recesses, and
means rendered effective following each intermittent rotation of said turret for moving said ejector to advance said fingers through said annular recesses to remove an article from the associated magnet.

5. In an apparatus for conveying paramagnetic articles,
a non-magnetic turret having a plurality of circumferentially spaced magnets,
means for intermittently imparting a rotating movement to said turret to move each succeeding magnet into a loading position,
means for intermittently advancing a succession of articles into said loading position to be held by each succeeding intermittently advanced magnet,
means operated by the rotation of the turret for successively gripping and then releasing each succeeding article held by a magnet, and
means rendered effective following each intermittent rotation of said turret for removing each released article from the associated magnet.

6. In a combined magnetic-mechanical article transfer apparatus,
an article gripping device mounted for linear movement in both horizontal and vertical directions, said article gripping device including a pair of movable normally open jaws,
a rotatable turret mounted on a vertical axis and having a series of magnets arrayed about its circumference,
a rack positioned between said gripping device and said turret for cyclically advancing a supply of articles, each having fragile paramagnetic portions and a non-fragile portion,
means for intermittently advancing the rack to position each article seriatim in register with said normally open jaws, and in register with one of said magnets in said turret,
means for horizontally moving said article gripping device to position said jaws to surround said non-fragile portion of the registered article,
means rendered effective following operation of said gripping device moving means for closing said jaws about said non-fragile portion of said registered article and then subsequently opening said jaws,
means rendered effective during closure of said jaws for vertically moving said article gripping device to remove said article from said rack and then for moving said gripping device in a horizontal direction to advance the paramagnetic portions of said gripped article to be attracted and held by the registered magnet upon said subsequent opening of said jaws, and
means rendered effective following each advance of said article gripping means for rotating said turret to position another magnet to receive a subsequent article.

7. In an apparatus for unloading articles positioned on a rack,
means for cyclically advancing the rack to position each succeeding article in an unload position,
a jaw device mounted for horizontal and vertical movement,
said jaw device having a movable jaw,
means rendered effective upon each advance of said rack for moving said jaw device in horizontal direction to position the jaw in register with the positioned article, and then moving said jaw device in a vertical direction and finally in a horizontal direction,
means rendered effective following the first horizontal movement of said jaw device for moving said jaw to grip the positioned article and for moving said jaw to release the gripped article following completion of said second horizontal movement,
a turret device movably mounted and having a plurality of magnets spaced about is periphery,
means for cyclically advancing said turret device to move each succeeding magnet into position to hold an article advanced and released by said jaw device,
a series of mechanical gripping elements mounted on said turret device and associated with groups of magnets and normally spaced from the articles held by said magnets, and
means rendered effective by said cyclic advance of said turret for actuating each succeeding mechanical gripping element to move into engagement with the articles held by the associated group of said magnets.

8. In an apparatus for feeding paramagnetic articles,
a turret having a circumferential recess,
a movably mounted welding electrode projecting into said recess,
a plurality of magnets circumferentially spaced about the periphery of said turret for holding said paramagnetic articles with the ends thereof projecting to overlie said circumferential recess,
a fixed electrode spaced from and aligned with said movably mounted electrode,
means for intermittently rotating said turret to advance each succeeding article between said electrodes,
means for intermittently advancing a metallic tape over said fixed electrode,
means rendered effective following each intermittent rotation of said turret for moving said movably mounted electrode to press the end of an article into engagement with said tape, and
means for applying welding energy to said electrodes while said article is pressed against said tape.

9. In an apparatus for advancing a series of paramagnetic articles, a turret device having a series of magnets circumferentially spaced about its periphery, a series of mechanical gripping elements movably mounted on said turret device for gripping the articles held by associated ones of said magnets, means for cyclically advancing said turret device, means rendered effective during each advance of said turret for advancing paramagnetic articles to be held by succeeding ones of said magnets, means rendered effective by each advance of said turret device for moving one of said gripping elements to grip the articles held by the associated magnets and for subsequently releasing said gripping elements, a first welding electrode, means for cyclically advancing a metallic carrier band over said first electrode, a second welding electrode mounted for movement toward an article released by said gripping element but held by one of said magnets for moving said article into engagement with said carrier band, means rendered effective following each advance of said turret device for moving said second electrode to move an article into engagement with said metallic band, and means rendered effective following advance of said movable electrode for applying welding current to said movable electrode to weld said article to said carrier band.

References Cited by the Examiner

UNITED STATES PATENTS

| | | | |
|---|---|---|---|
| 1,593,825 | 7/1926 | Higgins. | |
| 2,337,528 | 12/1943 | Stuckert et al. | 198—210 |
| 2,679,918 | 6/1954 | Vargo et al. | 198—41 |
| 2,907,367 | 10/1959 | Cormia | 198—41 |
| 2,919,801 | 1/1960 | Pechy | 198—41 |
| 3,123,703 | 3/1964 | Loeper | 219—79 X |

EVON C. BLUNK, *Primary Examiner.*

SAMUEL F. COLEMAN, *Examiner.*

R. M. WALKER, *Assistant Examiner.*